E. G. WYLAM.
DEMOUNTABLE RIM FOR VEHICLE WHEELS.
APPLICATION FILED JAN. 20, 1922.
1,427,670.
Patented Aug. 29, 1922.
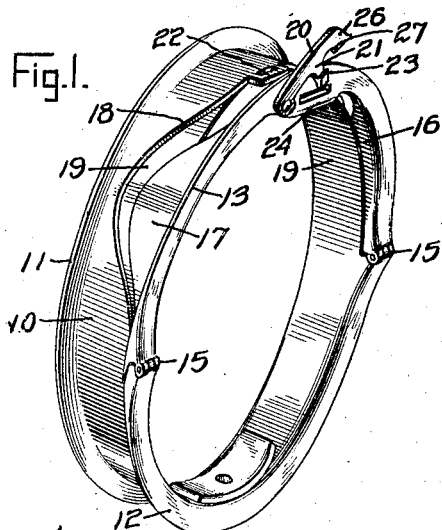
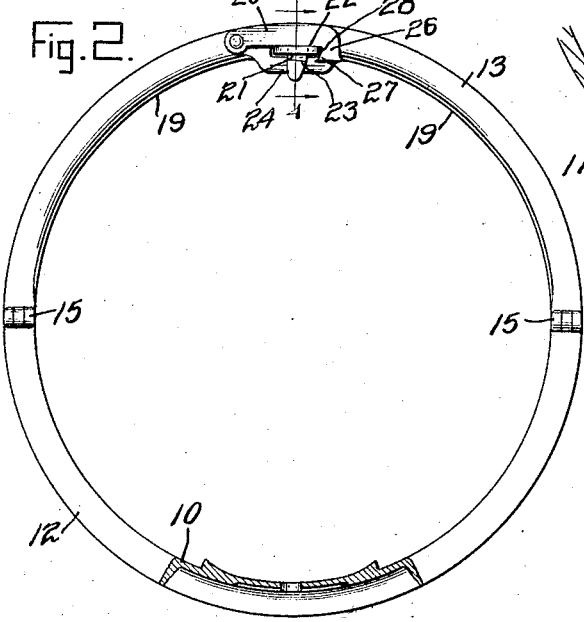
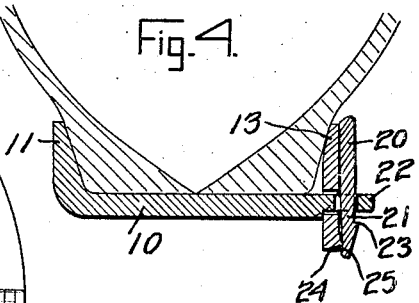
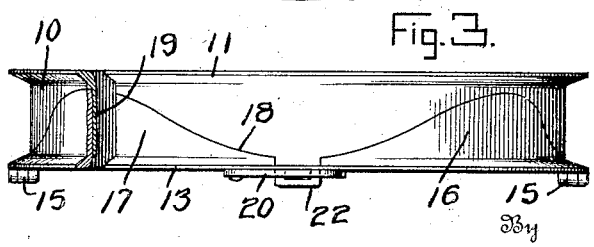
Inventor
Edward G. Wylam

UNITED STATES PATENT OFFICE.

EDWARD G. WYLAM, OF TAYLOR, PENNSYLVANIA.

DEMOUNTABLE RIM FOR VEHICLE WHEELS.

1,427,670. Specification of Letters Patent. Patented Aug. 29, 1922.

Application filed January 20, 1922. Serial No. 530,620.

*To all whom it may concern:*

Be it known that I, EDWARD G. WYLAM, a citizen of the United States, residing at Taylor, in the county of Lackawanna and State of Pennsylvania, have invented certain new and useful Improvements in Demountable Rims for Vehicle Wheels, of which the following is a specification.

My said invention relates to a demountable rim for vehicle wheels and finds its principal application in connection with wheels carrying pneumatic tires. The object of the invention is to provide a rim of this kind which will permit the tire to be readily removed and replaced.

Referring to the accompanying drawings which are made a part hereof and on which similar reference characters indicate similar parts, Figure 1 is a perspective of the device,
Figure 2 is a side elevation of my device,
Figure 3 is a plan of the same, and
Figure 4 a section on line 4—4 of Figure 2.

In the drawings 10 indicates the main web of my demountable rim having flanges 11 and 12, the first of which extends entirely around the web. A swingable rim-section has a radial flange 13 supplementing flange 12, this section being pivoted at 15 on the body. The pivoted section has also a pair of plates 16 and 17 with wavy edges corresponding to a wavy edge at 18 on the body and supplementary to the main web. The plates 16 and 17 are thinner than the main web and overlie extensions 19 thereon. This structure adds to the strength of the device inasmuch as the part 16 falling between said flanges 13 extends the full width of the tire. The tire slips easily into place and there is little danger of pinching it, in addition to which the parts are readily brought into assembled position after the tire is mounted on the rim.

As one means for holding the parts in closed position I have shown a latch 20 pivotally mounted on the member 13, this latch having a bolt portion 21 to pass into an opening in a lug 22 on the main web. The bolt 21 has a lug 23 near its end (Figure 4) to engage under the lug 22 and hold the parts in locked relation. A fin 24 on an inward extension of the pivoted section 15 coacts with a notch in the bolt at 25 and helps to hold the bolt in locking relation. A finger piece 26 is provided on the latch for convenience in operating the same and this finger piece has a rearwardly extending lug 27 to engage under the forward edge of the lug 22 at 28, this engagement being such that lug 27 can be forced past lug 22 in either direction, but will not slip past under the action of gravity or due to any jarring action. When the tire is in place it extends over the latch and prevents retraction thereof.

I have shown at 29 conventional means for preventing rotation of the rim about the felly of the wheel, the rim being held on the felly by the usual wedges. Any other means may, however, be substituted for performing these functions.

It will be evident to those skilled in the art that my device may be modified in various ways as by the use of a different form of latch or by different arrangement of parts. The true scope of the invention is set forth in the appended claims.

Having thus fully described my said invention, what I claim as new and desire to secure by Letters Patent, is:

1. A demountable rim for vehicle wheels comprising a channeled member having radially extending flanges and a web connecting them, a complemental member carrying a portion of one side flange and parts of said web, a lug on said body member projecting through said complemental member, and means for engaging the lug to hold the parts in operative position, substantially as set forth.

2. In a demountable rim for vehicle wheels, a web, an annular flange at one side thereof, a semi-circular flange at the other side, a complemental member comprising a semi-circular flange and web portions having wavy margins registering with corresponding portions of the main web, said main web having thin extensions underlying the flanges of said complemental member, substantially as set forth.

3. A demountable rim for vehicle wheels comprising a body having an annular flange at one side and a substantially semi-annular flange at the other, a complemental member hinged thereon and carrying web portions with wavy outlines to register with corresponding formations on the main web, a lug extending from the main web through said flange on the complemental member and means to engage said lug and hold the parts in operative relation, substantially as set forth.

4. A demountable rim for vehicle wheels comprising a main web, an annular flange at one side thereof, a segmental flange at the opposite side, hinges at the ends of said segmental flange and a member complemental to the web and the segmental flange carried by said hinges, a pivoted latch carried by said member and a lug on the main web extending through said member for engagement with the latch, substantially as set forth.

5. In a demountable rim for vehicle wheels, a main web having opposed annular flanges, a section of one flange being hinged to swing away from the web, and means to hold the pivoted section in operative position comprising a perforated lug on the main web extending through an opening in said section, a latch having a bolt extending through the perforation in the lug and a hook to engage under the lug, said bolt having also a notch engaging a fin on the pivoted section, a finger piece for operating the latch and a lug extending rearwardly from the finger piece for engaging underneath said perforated lug, substantially as set forth.

In witness whereof, I have hereunto set my hand and seal at Washington, District of Columbia, this 18th day of January, A. D. nineteen hundred and twenty-two.

EDWARD G. WYLAM.

Witnesses:
F. W. DOHN,
GEORGE DEWEY THOMAS.